No. 698,672. Patented Apr. 29, 1902.
T. DUNCAN.
ALTERNATING CURRENT METER.
(Application filed Nov. 18, 1899. Renewed Jan. 6, 1902.)
(No Model.)
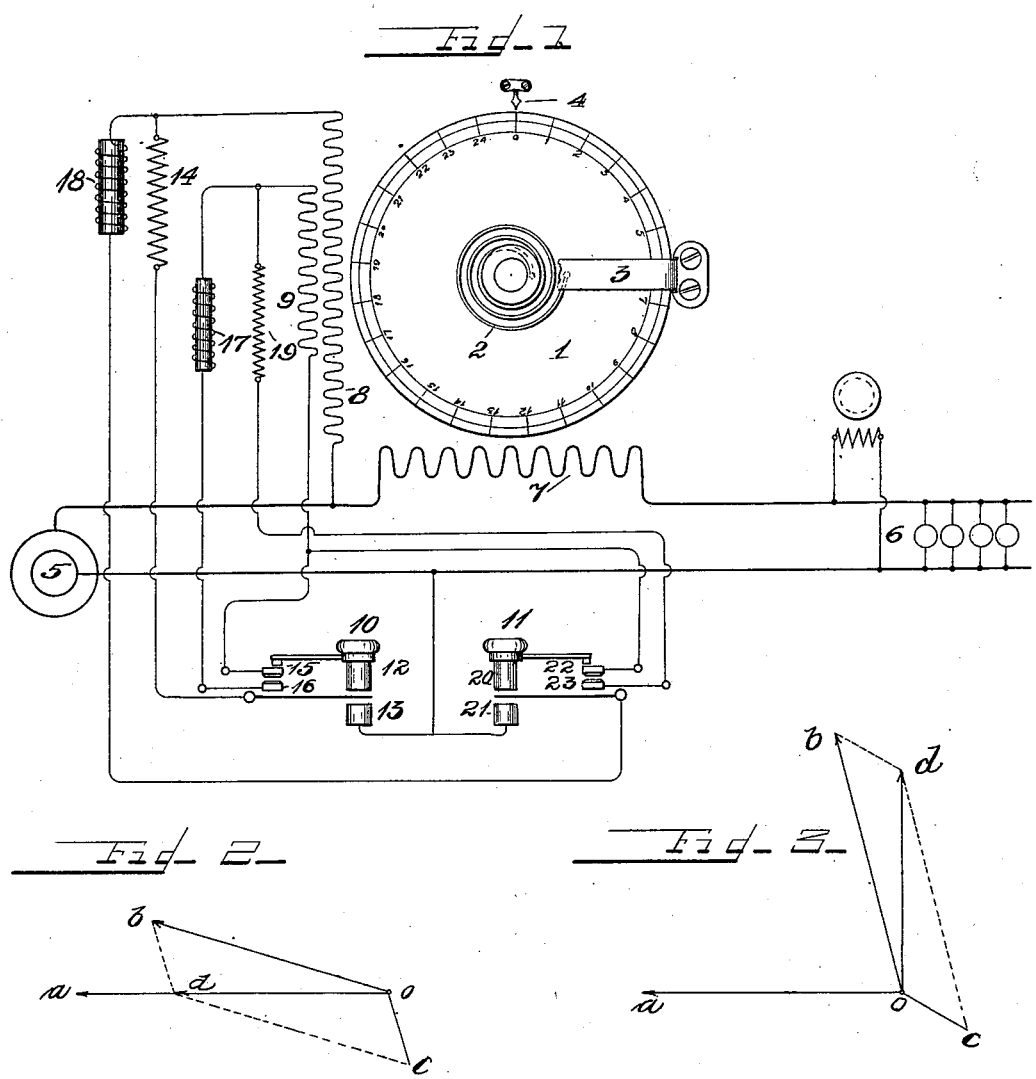
Witnesses
Max Zabel
Q. J. Schmidt
Inventor
Thomas Duncan
By Charles A. Brown & Cragg
Attorneys
THE NORRIS PETERS CO., PHOTO-LITHO., WASHINGTON, D. C.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ALTERNATING-CURRENT METER.

SPECIFICATION forming part of Letters Patent No. 698,672, dated April 29, 1902.

Application filed November 18, 1899. Renewed January 6, 1902. Serial No. 88,486. (No model.)

*To all whom it may concern:*

Be it known that I, THOMAS DUNCAN, a citizen of the United States, residing at Chicago, in the county of Cook and State of Illinois, have invented a certain new and useful Improvement in Alternating-Current Meters, (Case No. 322,) of which the following is a full, clear, concise, and exact description, reference being had to the accompanying drawings, forming a part of this specification.

My invention relates to alternating-current motor-meters, and has for its object the provision of an improved form of meter that is capable of measuring the "true" watts and the magnetizing component of alternating current.

In applications Serial Nos. 737,424 and 737,425, filed of even date herewith, I have shown and described instruments that were capable of measuring the true watts and the magnetizing component of alternating current. In each of the said instrumentalities of the said copending applications two pressure-windings were included in bridge of supply-mains, and a current-winding was included in the supply-circuit. The field due to one of the pressure-windings was maintained in quadrature with the impressed electromotive force, and the field due to the other pressure-winding was maintained in phase with the impressed electromotive force. By means of suitable switching apparatus one or the other of these pressure-windings could be included in bridge with the supply-mains to measure the wattless or magnetizing component and the true watts of the current, as desired. By means of my present invention I am enabled to dispense with one of the pressure-windings. In practicing my invention I associate two phase-modifying means with a pressure-winding preferably adapted for connection in metallic bridge of supply-mains, one of the phase-modifying means in coöperation with said pressure-winding serving to produce a resultant magnetic field that is in phase with the impressed electromotive force, the other phase-modifying means in coöperation with the said pressure-winding serving to produce a resultant magetic field that is in quadrature with the impressed electromotive force. I preferably employ switching apparatus by means of which one or the other of these phase-modifying means may be associated with the pressure-winding to determine the true watts or the magnetizing component.

It will be unnecessary here to set forth the advantages of an instrument that is adapted to measure the wattless component, as these advantages have been fully set forth in application Serial No. 730,847, filed September 18, 1899.

I will explain my invention more particularly by reference to the accompanying drawings, illustrating one embodiment thereof, in which—

Figure 1 is a view diagrammatically illustrating my improved apparatus. Figs. 2 and 3 are vector diagrams illustrating the phase relations between magnetic fields and the impressed electromotive force.

Fig. 1 shows the application of the invention as an indicating instrument. As the instrument illustrated is an induction-meter, the armature 1 is inductively acted upon by the motive coils, said armature preferably being in the form of an aluminium disk, which is pivoted at its center and is held by a suitable spring 2, attached to the hub of the disk at one end and to a supporting-arm 3 at the other end. This disk will rotate in opposition to the said spring under the influence of magnetism due to the current in the operating-coils, as will be set forth.

A pointer 4 serves to indicate the extent of movement of the disk to measure the magnetizing component or the true watts of the current, according to the manipulation of the instrument. A generator 5 supplies current to the translating devices 6. At one side of the disk is secured a series field-coil 7, shown in series with the main line and traversed by current supplied to the translating devices. This current sets up a magnetic field in the coil 7 that is proportional to the current strength. A shunt-winding of fine wire 8 and an auxiliary winding 9 are placed in inductive relation with another portion of the disk 1. Keys 10 and 11 are provided for controlling the continuity of the circuits including the windings 8 and 9. When the key 10 is depressed, the switch-contacts 12 and 13 are closed to include the winding 8 in bridge between the supply-mains, a non-inductive resistance 14 being included in the same bridge with the winding 8. The contacts 15 and 16 are also closed upon the action of the key 10 to include the winding 9 in a local circuit with inductance 17, as will be more fully explained. When the key 10 is thus actuated, the currents in the coils 8 and 9 coöperate to produce a resultant magnetic field that is maintained in phase with the impressed electromotive force, whereby the armature 1 may be rotated to measure the wattless component of the current. There will be no shifting field between the series coil 7 and the compound coil 8 9 when the translating devices are non-inductive or when the current in the leads is in phase with its electromotive force; but as the current lags in the work-circuit the torque will increase proportionately until a lag of ninety degrees is reached, when the torque will reach its maximum. This will be understood by reference to Fig. 2, where $o\,a$ may represent the impressed electromotive force; $o\,b$, the current and magnetism of the winding 8; $o\,c$, the current and magnetism of the auxiliary winding 9, and $o\,d$ the resultant magnetism of the windings 8 and 9 in phase with the impressed electromotive force.

The non-inductive resistance 14 is employed for the purpose of keeping the phase of the current $o\,b$ as nearly as possible in phase with the electromotive force $o\,a$. The inductance 17 is employed to determine the phase of the current in the winding 9 with respect to the phase of the current in the winding 8.

If it should be desired to measure the "real" watts, the key 10 is released and the key 11 depressed, so that the coils 14 and 17 are removed from circuit and the coils 18 and 19 are included in circuit, as will be more particularly set forth. Upon the depression of the key 11 the switch-contacts 20 and 21 are closed to include the winding 8 and the inductance 18 in series in the same bridge between the supply-mains. The contacts 22 and 23 are also closed to include the non-inductive resistance 19 in local circuit with the auxiliary winding 9. When the key 11 is thus depressed, the resultant magnetism due to the current in the windings 8 and 9 is maintained in quadrature with the impressed electromotive force, this resultant field coöperating with the field due to the current-coil 7 to produce rotation of the armature proportional to the true watts. When the load is non-inductive, the resultant magnetism of the windings 8 and 9 is ninety degrees behind the current of the main leads. Referring in this connection to Fig. 3, $o\,a$ represent the electromotive force; $o\,b$, the current and magnetism of the winding 8; $o\,c$, the current and magnetism of the winding 9, and $o\,d$ the resultant magnetism of the coils 8 and 9 in quadrature with the pressure. The current in the coil 8 is lagged behind the electromotive force by including the inductance 18 in circuit with said windings, and the magnitude of the current in the winding 9 is regulated by means of the resistance 19. Torques may thus be produced, one to cause rotation of the armature proportional to the magnetizing component and the other to produce rotation of the armature proportional to the true watts, these torques acting at different times to secure these measurements.

While I have herein shown and particularly described one type of meter constructed in accordance with my invention, I do not wish to be limited to the precise apparatus shown, nor to the precise instrumentalities employed for making the phase-modifiers of different electrical character, as modifications may readily be made without departing from the spirit of my invention.

Having, however, thus described my invention, I claim as new and desire to secure by Letters Patent—

1. In an alternating-current meter, the combination with a measuring element, of a current-winding, a pressure-winding, a means adapted to coöperate with the pressure-winding to produce a resultant magnetic field which with the current-field serves to exert a torque upon said measuring element proportional to the "true" watts, and a second means adapted to coöperate with the same pressure-winding to produce a resultant field which with the current-field serves to exert torque upon said measuring element proportional to the magnetizing component, substantially as described.

2. In an alternating-current meter, the combination with a measuring element, of a current-winding, a pressure-winding, means adapted to coöperate with the pressure-winding to produce a resultant magnetic field which with the current-field serves to move the measuring element proportionally to the "true" watts, a second means adapted to coöperate with the same pressure-winding to produce a resultant magnetic field which, with the current-field, serves to move said measuring element proportionately to the wattless component, and means for associating either of the aforesaid means with said pressure-winding independently of the other, substantially as described.

3. In an alternating-current meter, the combination with a measuring element, of means for exerting torque thereon proportional to the "true" watts, and means for exerting torque upon said element proportional to the magnetizing component, a single pressure-winding being common to, and comprising a portion of, both of said means, substantially as described.

4. In an alternating-current meter, the combination with a measuring element, of means for moving the same proportionally to the "true" watts, second means for moving the measuring element proportional to the wattless component, a single pressure-winding being common to both of said means, and means for associating either of the aforesaid means with said pressure-winding independently of the other, substantially as described.

5. In an alternating-current meter, the combination with a movable measuring element, of a pressure field-winding, a phase-modifying means for bringing the field of the said pressure-winding in phase with the pressure, and a second phase-modifying means for bringing the field thereof in quadrature with the pressure, substantially as described.

6. In an alternating-current meter, the combination with a movable measuring element, of a pressure field-winding, a phase-modifying means for bringing the field of the said pressure-winding in phase with the pressure, a second phase-modifying means for bringing the field of said pressure-winding in quadrature with the pressure, and switching apparatus for bringing either of said means in coöperative relation with the pressure-winding independently of the other, substantially as described.

7. In an alternating-current meter, the combination with a movable measuring element, of a pressure field-winding, a phase-modifying means for bringing the field of the said pressure-winding in phase with the pressure, a second phase-modifying means for bringing the field of said pressure-winding in quadrature with the pressure, a current-winding for producing a field varying in phase with the current, and switching apparatus for bringing either of the said means in coöperative relation with the pressure-winding independently of the other, substantially as described.

8. In an alternating-current meter, the combination with a measuring element, of a current field-winding for producing a field varying in phase with the current, a pressure field-winding, an auxiliary circuit, reactance, resistance, and switching apparatus for including reactance in circuit with the pressure-winding and at the same time including resistance in said auxiliary circuit, or for including resistance in circuit with the pressure-winding and at the same time including reactance in the auxiliary circuit, substantially as described.

9. In an alternating-current meter, the combination with a movable measuring element, of a current-winding, a pressure-winding, phase-modifying means adapted in coöperation with said current and pressure windings to exert a torque upon the measuring element proportional to the "true" watts, second phase-modifying means adapted in coöperation with said current and pressure winding to exert a torque upon the measuring element proportional to the magnetizing component, and switching apparatus for associating either of said phase-modifying means with said pressure-winding, substantially as described.

10. In an alternating-current motor, the combination with a movable element, of a field-winding, two magnetic phase-modifying means of different electrical character for modifying the phase of magnetism due to said field-winding, and means whereby one phase-modifying means may be associated with said field-winding independently of the other, substantially as described.

11. In an alternating-current motor, the combination with a movable element, of a field-winding, two magnetic phase-modifying means of different electrical character for modifying the phase of magnetism due to said field-winding, and means for independently associating each phase-modifying means with, and disassociating it from, the field-winding, substantially as described.

In witness whereof I hereunto subscribe my name this 14th day of November, A. D. 1899.

THOMAS DUNCAN.

Witnesses:
JAMES DALTON,
WM. F. MEYER.